US008843574B2

(12) United States Patent
Nagamine

(10) Patent No.: US 8,843,574 B2
(45) Date of Patent: Sep. 23, 2014

(54) ELECTRONIC MAIL SYSTEM, USER TERMINAL APPARATUS, INFORMATION PROVIDING APPARATUS, AND COMPUTER READABLE MEDIUM

(75) Inventor: Takeshi Nagamine, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 347 days.

(21) Appl. No.: 13/245,355

(22) Filed: Sep. 26, 2011

(65) Prior Publication Data

US 2012/0246243 A1    Sep. 27, 2012

(30) Foreign Application Priority Data

Mar. 22, 2011  (JP) .................................. 2011-062842

(51) Int. Cl.
| | | |
|---|---|---|
| *G06F 15/173* | (2006.01) | |
| *G06F 15/16* | (2006.01) | |
| *H04L 29/06* | (2006.01) | |
| *H04L 29/08* | (2006.01) | |

(52) U.S. Cl.
CPC ................ *G06F 15/16* (2013.01); *H04L 29/06* (2013.01); *H04L 29/08072* (2013.01)
USPC ............ 709/206; 709/220; 709/224; 173/170

(58) Field of Classification Search
CPC .......................... H04L 29/08072; H04L 29/06
USPC ......................................... 709/206, 220, 228
See application file for complete search history.

(56) References Cited

U.S. PATENT DOCUMENTS

| | | | | |
|---|---|---|---|---|
| 6,510,834 | B1* | 1/2003 | Tomita et al. ................. | 123/295 |
| 7,860,931 | B2* | 12/2010 | Yabe et al. .................... | 709/206 |
| 2006/0101118 | A1* | 5/2006 | Yabe et al. .................... | 709/206 |
| 2008/0244070 | A1* | 10/2008 | Kita et al. ..................... | 709/225 |
| 2008/0288605 | A1* | 11/2008 | Major et al. .................. | 709/207 |
| 2009/0172118 | A1* | 7/2009 | Lee et al. ...................... | 709/206 |
| 2010/0205258 | A1* | 8/2010 | Smelyansky .................. | 709/206 |
| 2011/0078263 | A1* | 3/2011 | Watanabe ..................... | 709/206 |
| 2011/0125858 | A1* | 5/2011 | Yamabana .................... | 709/206 |

FOREIGN PATENT DOCUMENTS

| | | |
|---|---|---|
| JP | 07-264236 A | 10/1995 |
| JP | 08-097850 A | 4/1996 |

* cited by examiner

*Primary Examiner* — Khanh Dinh
(74) *Attorney, Agent, or Firm* — Sughrue Mion, PLLC

(57) ABSTRACT

An electronic mail system includes plural user terminal apparatuses, a distribution apparatus, an information providing apparatus, and a storage device. The distribution apparatus distributes an electronic mail to a specified destination in response to a distribution request for distributing the electronic mail. The distribution request is sent from any of the plural user terminal apparatuses. Each of the plural user terminal apparatuses includes a display processing unit that performs a process to display a list of electronic mails, a detecting unit that detects a process, and a process detection information sending unit that sends process detection information. The information providing apparatus includes a registration unit that obtains and registers the process detection information, a history information generating unit that generates history information, and a history information sending unit that sends the generated history information.

13 Claims, 9 Drawing Sheets

FIG. 3

| MAIL ID | NUMBER OF DESTINATIONS |
|---|---|
| m0001 | 123 |
| m0002 | 45 |
| ⋮ | ⋮ |

FIG. 4

| PROCESS ID | MAIL ID | DATE/TIME OF START OF PROCESS | DATE/TIME OF END OF PROCESS | USER ID |
|---|---|---|---|---|
| prc002 | m0012 | yyyy-mm-dd hh:mm | yyyy-mm-dd hh:mm | madd001 |
| ⋮ | ⋮ | ⋮ | ⋮ | ⋮ |

FIG. 5

| PROCESS ID | TYPE | DETAILS |
|---|---|---|
| prc001 | p | DISPLAY MAIL TEXT |
| prc002 | p | SCROLL MAIL TEXT TO THE END |
| prc003 | p | OPEN ATTACHMENT FILE |
| prc004 | p | CLICK URL IN MAIL TEXT |
| prc005 | p | SEND REPLY |
| prc006 | p | FORWARD E-MAIL |
| prc007 | n | DELETE E-MAIL |
| prc008 | n | DESIGNATE E-MAIL AS UNWANTED E-MAIL |
| prc009 | p | ADD TAG |
| ⋮ | ⋮ | ⋮ |

FIG. 10

| USER ID | ATTRIBUTES | | | | MAIL ID |
|---|---|---|---|---|---|
| | DEPARTMENT | POSITION | SEX | ... | |
| madd001 | SALES DEPARTMENT | MANAGER | MALE | ... | m0002, m0012, ... |
| ⋮ | ⋮ | ⋮ | ⋮ | ⋮ | ⋮ |

# ELECTRONIC MAIL SYSTEM, USER TERMINAL APPARATUS, INFORMATION PROVIDING APPARATUS, AND COMPUTER READABLE MEDIUM

CROSS-REFERENCE TO RELATED APPLICATIONS

This application is based on and claims priority under 35 USC 119 from Japanese Patent Application No. 2011-062842 filed Mar. 22, 2011.

BACKGROUND (i) Technical Field

The present invention relates to an electronic mail system, a user terminal apparatus, an information providing apparatus, and a computer readable medium.

(ii) Related Art

An electronic mail (e-mail) tool is available as one of tools for performing communication via a network. If a user who has received an e-mail does not voluntarily open the e-mail, the e-mail is not referred to.

SUMMARY

According to an aspect of the invention, there is provided an electronic mail system including plural user terminal apparatuses, a distribution apparatus that distributes an electronic mail to a specified destination in response to a distribution request for distributing the electronic mail, the distribution request being sent from any of the plural user terminal apparatuses, an information providing apparatus, and a storage device. Each of the plural user terminal apparatuses includes a display processing unit that performs a process to display a list of electronic mails addressed to a user of the user terminal apparatus, the electronic mails including an electronic mail that is distributed from the distribution apparatus and that is addressed to plural users, a detecting unit that detects a process specified to be performed by the user on an electronic mail displayed by the display processing unit, and a process detection information sending unit that sends process detection information that includes process specification information specifying details of the process detected by the detecting unit and mail identification information about the electronic mail on which the process has been performed. The information providing apparatus includes a registration unit that obtains the process detection information sent by the process detection information sending unit and registers the process detection information in the storage device, a history information generating unit that generates history information representing history of processes performed by users on the electronic mail addressed to the plural users on the basis of the process detection information registered in the storage device, and a history information sending unit that sends the generated history information to the user terminal apparatus. The display processing unit generates, on the basis of the history information generated by the history information generating unit, status information representing a status of actions performed by users on the electronic mail addressed to the plural users, and displays the generated status information in association with the corresponding electronic mail.

BRIEF DESCRIPTION OF THE DRAWINGS

Exemplary embodiment(s) of the present invention will be described in detail based on the following figures, wherein:

FIG. 3 is a diagram illustrating an example of a data structure of mail information registered in a mail information storage unit according to the first exemplary embodiment;

FIG. 4 is a diagram illustrating an example of a data structure of process detection information registered in a process detection information storage unit according to the first exemplary embodiment;

FIG. 5 is a diagram illustrating an example of a list of details of processes detected in the first exemplary embodiment;

FIG. 10 is a diagram illustrating an example of a data structure of attribute information registered in an attribute information storage unit according to the second exemplary embodiment.

DETAILED DESCRIPTION

Hereinafter, exemplary embodiments of the present invention will be described with reference to the drawings.

First Exemplary Embodiment

Figure 1:
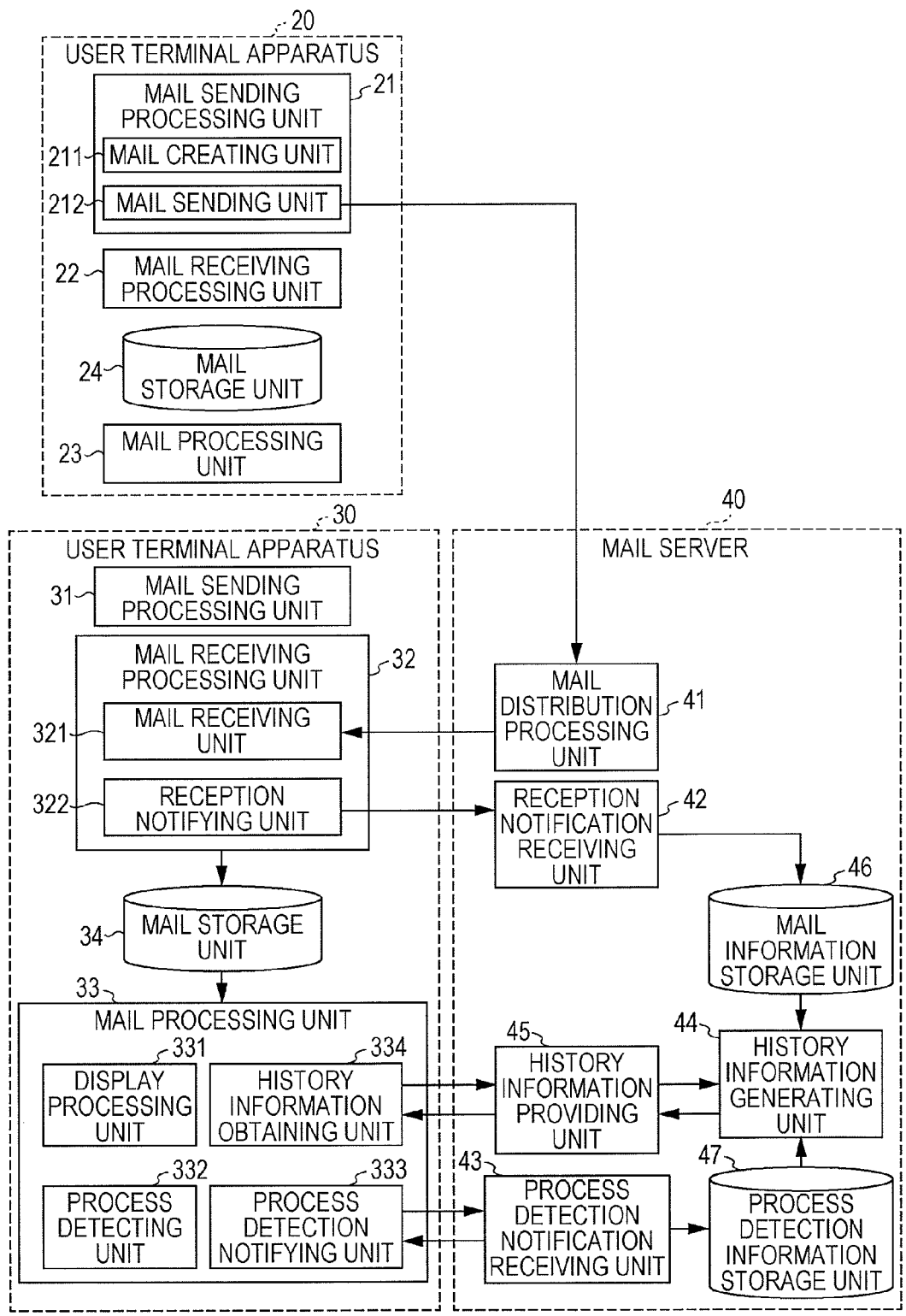
FIG. 1 is a block diagram illustrating a configuration of an electronic mail system according to a first exemplary embodiment of the present invention.

FIG. 1 is a block diagram illustrating a configuration of an electronic mail (e-mail) system according to a first exemplary embodiment of the present invention. FIG. 1 illustrates user terminal apparatuses 20 and 30 and a mail server 40, which are connected to a network (not illustrated). Each of the user terminal apparatuses 20 and 30 has an e-mail function and sends/receives an e-mail via the mail server 40. There are plural user terminal apparatuses 20 and 30, which may have the same configuration. FIG. 1 illustrates only two user terminal apparatuses 20 and 30 for the convenience of description of sending and receiving of e-mails.

Figure 2:
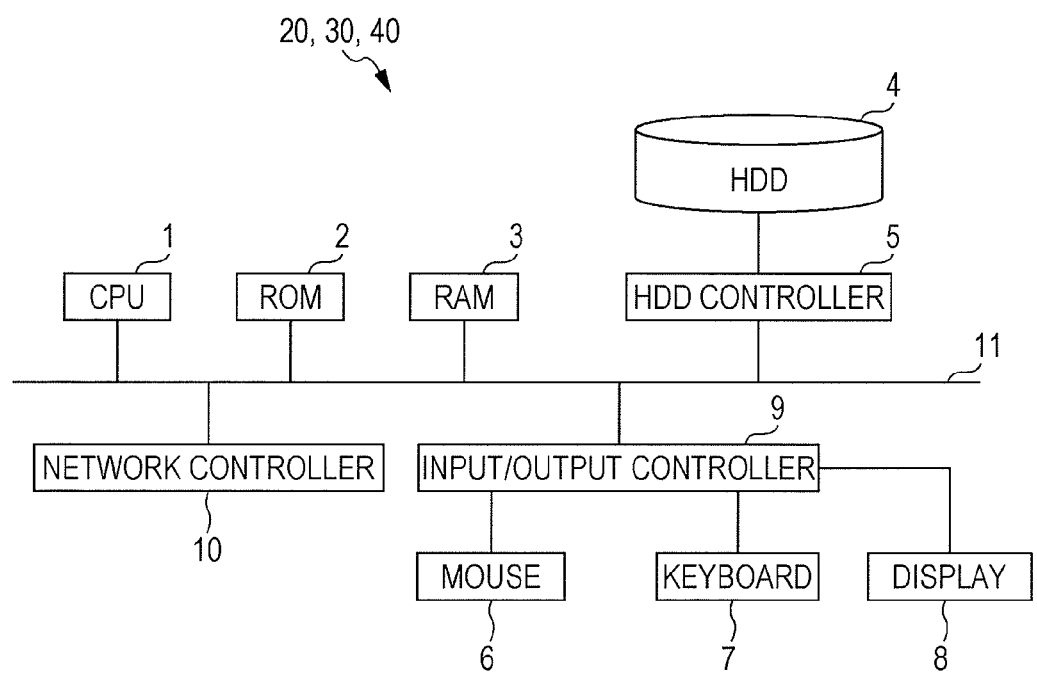
FIG. 2 is a block diagram illustrating a hardware configuration of a computer that forms user terminal apparatuses and a mail server according to the first exemplary embodiment.

FIG. 2 is a block diagram illustrating a hardware configuration of a computer forming the user terminal apparatuses 20 and 30 and the mail server 40 according to this exemplary embodiment. In this exemplary embodiment, the computer forming the user terminal apparatuses 20 and 30 may be realized by an existing general-purpose hardware configuration. That is, as illustrated in FIG. 2, the computer includes a central processing unit (CPU) 1, a read only memory (ROM) 2, a random access memory (RAM) 3, a hard disk drive (HDD) controller 5 connected to an HDD 4, an input/output controller 9 connected to a mouse 6 and a keyboard 7 serving as input units and to a display 8 serving as a display device, and a network controller 10 serving as a communication unit, which are connected to an internal bus 11. Also, the mail server 40 is realized by an existing general-purpose server computer, and thus may have the same configuration as that illustrated in FIG. 2.

Referring back to FIG. 1, the user terminal apparatus 20 includes a mail sending processing unit 21, a mail receiving processing unit 22, a mail processing unit 23, and a mail storage unit 24. Likewise, the user terminal apparatus 30 includes a mail sending processing unit 31, a mail receiving processing unit 32, a mail processing unit 33, and a mail storage unit 34. The mail sending processing unit 21 includes a mail creating unit 211 that creates an e-mail in accordance with a user operation, and a mail sending unit 212 that sends a created e-mail to a destination specified by a user via the mail server 40. Likewise, the mail sending processing unit 31 includes a mail creating unit and a mail sending unit, which are not illustrated for convenience because they are not referred to in the description of this exemplary embodiment.

The mail receiving processing unit 32 includes a mail receiving unit 321 that receives an e-mail sent from the user terminal apparatus 20 and stores the e-mail in the mail storage unit 34, and a reception notifying unit 322 that notifies the mail server 40 of reception of an e-mail upon reception of the e-mail. A reception notification includes mail identification information (hereinafter "mail ID") of the e-mail. Likewise, the mail receiving processing unit 22 includes a mail receiving unit and a reception notifying unit, which are not illustrated for convenience because they are not referred to in the description of this exemplary embodiment.

The mail processing unit 33 includes a display processing unit 331, a process detecting unit 332, a process detection notifying unit 333, and a history information obtaining unit 334. The display processing unit 331 performs processes regarding display of e-mails, for example, displays a list of e-mails stored in an e-mail storage site, such as an incoming mailbox or an outgoing mailbox, and displays the content of an e-mail. In this exemplary embodiment, the display processing unit 331 generates status information representing a status of actions performed by users on an e-mail addressed to plural users on the basis of history information sent from the mail server 40, and displays the status information in a certain display form. The process detecting unit 332 is a detecting unit that detects that a user has performed a process on an e-mail received by the mail receiving unit 321. The process detection notifying unit 333 is a reception notification information sending unit that sends, to the mail server 40, process specification information that specifies the details of a process detected by the process detecting unit 332 and reception notification information including the mail ID of a processed e-mail. The history information obtaining unit 334 is a history information obtaining unit that receives and obtains history information sent from the mail server 40 in response to a request sent to the mail server 40. Likewise, the mail processing unit 23 includes a display processing unit, a process detecting unit, a process detection notifying unit, and a history information obtaining unit, which are not illustrated for convenience because they are not referred to in the description of this exemplary embodiment.

The mail storage units 24 and 34 correspond to so-called mailboxes. Received e-mails and sent e-mails are stored in the mail storage units 24 and 34 while being sorted in the mailboxes.

The individual elements 21 to 23 and 31 to 33 in the user terminal apparatuses 20 and 30 are realized by a cooperative operation performed by the computers forming the user terminal apparatuses 20 and 30 and programs executed by the CPUs 1 mounted in the computers. The mail storage units 24 and 34 are realized by the HDDs 4 mounted in the user terminal apparatuses 20 and 30. In this exemplary embodiment, the mail storage units 24 and 34 are provided in the user terminal apparatuses 20 and 30, respectively. Alternatively, the mail storage units 24 and 34 may be provided in an external apparatus, such as a mail server.

The mail server 40 includes a mail distribution processing unit 41, a reception notification receiving unit 42, a process detection notification receiving unit 43, a history information generating unit 44, a history information providing unit 45, a mail information storage unit 46, and a process detection information storage unit 47. The mail distribution processing unit 41 sends an e-mail to a specified destination in response to a distribution request for distributing the e-mail, the distribution request being sent from any of the user terminal apparatuses 20 and 30. When receiving a distribution request for distributing an e-mail addressed to plural users, the mail distribution processing unit 41 distributes the e-mail to specified destinations after adding mail identification information, which identifies the e-mail, to the e-mail. When receiving reception notification information sent from the user terminal apparatus 20 or 30, the reception notification receiving unit 42 updates the mail information stored in the mail information storage unit 46 on the basis of the reception notification information. The process detection notification receiving unit 43 is a registration unit that receives and obtains process detection information sent from the user terminal apparatus 20 or 30 and then writes the process detection information into the process detection information storage unit 47 to register the process detection information therein. The history information generating unit 44 is a history information generating unit that generates history information representing the history of processes performed by users on an e-mail addressed to plural users on the basis of the mail information stored in the mail information storage unit 46 and the process detection information registered in the process detection information storage unit 47. The history information providing unit 45 sends history information generated by the history information generating unit 44 in response to a send request for sending it from the user terminal apparatus 20 or 30, thereby providing the history information.

FIG. 3 is a diagram illustrating an example of a data structure of mail information registered in the mail information storage unit 46 according to this exemplary embodiment. The mail information includes a mail ID, which is associated with the number of destinations of the e-mail, the number of destinations corresponding to the number of times the reception notification receiving unit 42 receives reception notification information including the mail ID.

FIG. 4 is a diagram illustrating an example of a data structure of process detection information registered in the process detection information storage unit 47 according to this exemplary embodiment. The process detection information includes process specification information (hereinafter "process ID") that specifies the details of a process performed by a user on the e-mail, the mail ID of the e-mail, the date/time of start of the process, which indicates the date and time when the process on the e-mail started, the date/time of end of the process, which indicates the date and time when the process ended, and a user ID identifying the user, which are associated with one another. In this exemplary embodiment, the process detecting unit 332 detects a process performed by a user on an e-mail. The types of processes to be detected are listed in advance, as illustrated in FIG. 5. Process IDs for identifying respective processes are assigned to the processes. These process IDs are set in the process ID column in the process detection information. The process detail table illustrated in FIG. 5 is provided such that the mail processing units 23 and 33 and the mail server 40 are capable of referring to the table. In this exemplary embodiment, process detail tables containing the same content are provided in the individual computers of the user terminal apparatuses 20 and 30 and the mail server 40. Alternatively, the process detail table may be provided in any one of the computers so that each of the apparatuses may access it when necessary. The user ID may be a mail address of the user, which serves as information identifying the user who has processed the e-mail.

The individual elements 41 to 45 in the mail server 40 are realized by a cooperative operation performed by the computer forming the mail server 40 and a program executed by the CPU 1 mounted in the computer. The storage units 46 and 47 are realized by the HDD 4 mounted in the mail server 40.

In this exemplary embodiment, a distribution apparatus including the mail distribution processing unit 41, which is a unit for realizing a mail server function, and an information providing apparatus realized by the other elements 42 to 47 are realized by the single mail server 40. Alternatively, the distribution apparatus and the information providing apparatus may be realized by apparatuses separate from each other. Specifically, the distribution apparatus and the information providing apparatus may be realized by separate apparatuses, and plural mail servers (distribution apparatuses) may be provided in the e-mail system. Also, the elements 42 to 47 may be distributed in plural computers, not in a single computer.

The programs used in this exemplary embodiment may be provided by being stored in a computer readable recording medium, such as a compact disc-read only memory (CD-ROM) or a digital versatile disc-read only memory (DVD-ROM), as well as using a communication unit. The programs provided through a communication unit or a recording medium are installed into a computer, and the CPU of the computer sequentially executes the installed programs, thereby realizing various processes.

Next, operation according to this exemplary embodiment will be described. In this exemplary embodiment, status information about an e-mail addressed to plural users is provided. Particularly, information for causing a user to perform an action on an unopened e-mail is provided. First, a description will be given of a process in which an e-mail addressed to plural users is distributed and is finally stored in the incoming mailbox of each user terminal apparatuses. Here, a description will be given of an e-mail distribution process in which an e-mail addressed to plural users is distributed from the user terminal apparatus 20 and is finally registered in the incoming mailbox in the mail storage unit 34 of the user terminal apparatus 30.

The mail creating unit 211 of the user terminal apparatus 20 creates an e-mail addressed to plural users in accordance with a user operation, and then the mail sending unit 212 sends the created e-mail.

The mail distribution processing unit 41 of the mail server 40 receives the e-mail sent from the user terminal apparatus 20. If plural destinations (including CC and BCC) are specified in the e-mail, the mail distribution processing unit 41 generates a mail ID identifying the e-mail. Then, the mail distribution processing unit 41 adds the mail ID to the e-mail, and distributes the e-mail to the specified destinations. That is, when the e-mail is addressed to plural users, the e-mails distributed to the individual destinations have the same mail ID.

In the user terminal apparatus 30 used by a user, who is one of the destinations of the e-mail, the mail receiving unit 321 stores the received e-mail in the incoming mailbox together with the mail ID. If the mail ID is added to the received e-mail, the reception notifying unit 322 generates reception notification information including the mail ID added to the received e-mail, and sends the reception notification information to the mail server 40, thereby notifying the mail server 40 of the reception of the e-mail addressed to plural users.

When the reception notification information is sent from the user terminal apparatus 30, the reception notification receiving unit 42 of the mail server 40 receives the reception notification information. Then, the reception notification receiving unit 42 increments the number of destinations corresponding to the mail ID by one, among the numbers of destinations held in the mail information storage unit 46. If the corresponding mail ID has not been registered, the mail information (representing that the number of destinations is one) regarding the mail ID is newly registered in the mail information storage unit 46. That is, the number of pieces of reception notification information sent from the user terminal apparatuses 30 specified as the destinations of the e-mail corresponds to the number of destinations of distribution performed by the mail distribution processing unit 41. Thus, the number of receptions of the reception notification information corresponds to the number of destinations of distribution performed by the mail distribution processing unit 41, that is, the number of mail addresses specified as the destinations of the e-mail sent from the user terminal apparatus 20.

Figure 6:
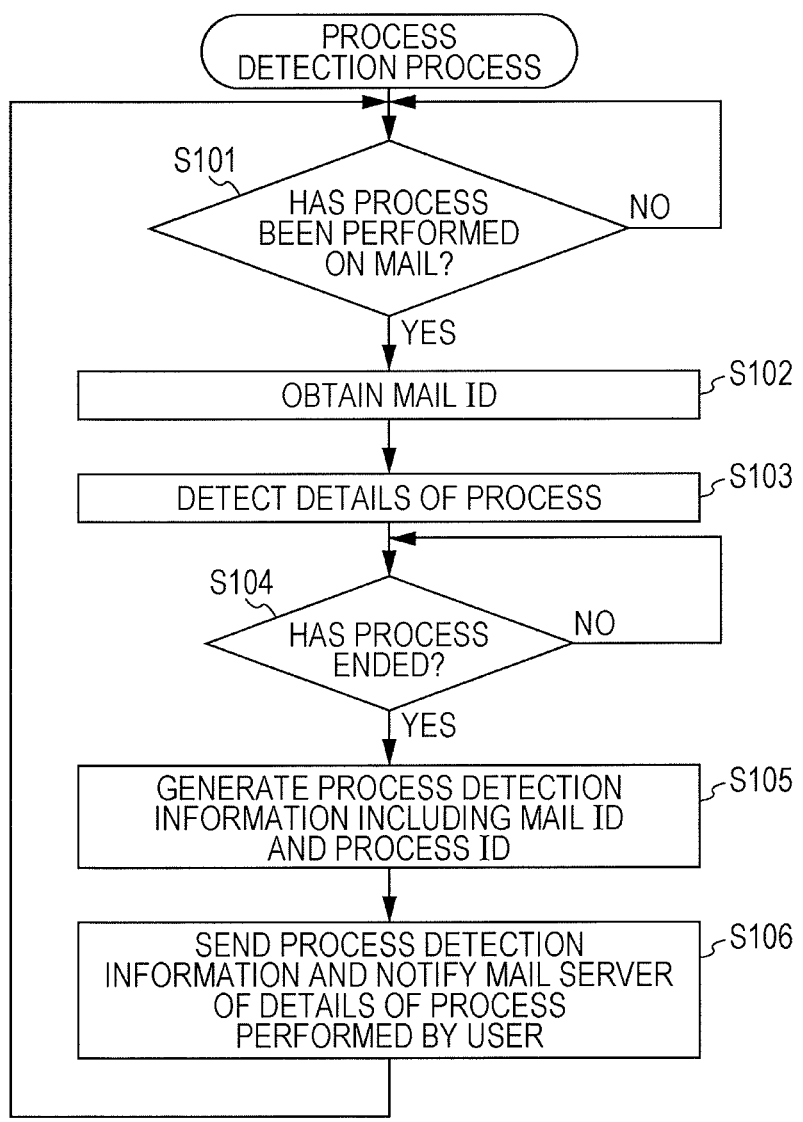
FIG. 6 is a flowchart illustrating a process detection process according to the first exemplary embodiment.

The user of the user terminal apparatus 30 operates the mouse 6 or the like to perform a certain process on the e-mail received in the above-described manner, for example, read the e-mail. Now, a process detection process of detecting a process performed by the user on the e-mail will be described with reference to the flowchart illustrated in FIG. 6.

When an e-mail tool is activated, an initial screen is displayed in which the storage status of e-mails in the incoming mailbox is shown. Typically, titles, senders, dates and times of reception, and symbols such as icons representing the presence/absence of an attachment file or opened/unopened (read/unread) for the individual e-mails stored in the incoming mailbox are displayed in time-series order.

A process monitoring process according to this exemplary embodiment is started in accordance with the activation of the e-mail tool, and the process detecting unit 332 constantly monitors a process performed by the user on an e-mail (step S101). When the user performs a process on an e-mail (YES in step S101), the process detecting unit 332 obtains the mail ID of the e-mail on which the process has been performed (step S102). Then, the process detecting unit 332 continuously detects an operation for the process (step S103) until the process performed by the user ends (YES in step S104).

For example, it is assumed that the user selects a desired e-mail from the list of e-mails, causes the mail text to be displayed on the screen, scrolls the mail text to the end, and ends display of the mail text by closing the window. In this case, the process detecting unit 332 obtains the date/time of display on the screen as the date/time of the start, and the date/time of end of display as the date/time of the end. Also, the process detecting unit 332 refers to the process detail table illustrated in FIG. 5 and obtains the process ID assigned to the detected process ("prc002" in the example in FIG. 5). Then, the process detecting unit 332 obtains the destination of the e-mail serving as a process target, that is, the mail address of the own apparatus, and generates process detection information including the process ID, the mail ID, the dates/times of the start and end of the process, and the mail address obtained in the above-described respective steps (step S105). Then, the process detection notifying unit 333 sends the generated process detection information to the mail server 40, thereby notifying the mail server 40 that the e-mail identified by the mail ID has been processed by the user (step S106).

The process of scrolling the mail text as in the foregoing example may be realized by operations of a scroll-up button and a scroll-down button, that is, operations of plural buttons. In this exemplary embodiment, such operations of the buttons are handled as a single action, that is, a single process called a scrolling process. Also, in the foregoing example, there is a time width of an e-mail display period defined by the dates/ times of the start and end. However, some processes do not have such a time width. In that case, the date/time of the execution of a process may be set as one or both of the date/time of the start and the date/time of the end. That is, the setting of information is not specified as long as an agreement is made between the history information generating unit 44 that handles process detection information and the process detecting unit 332.

When the process detection information is sent from the user terminal apparatus 30, the process detection notification receiving unit 43 of the mail server 40 receives the process detection information, and registers it in the process detection information storage unit 47.

In this way, every time the user performs a process on an e-mail, the process is detected, and the process detection information is stored in the process detection information storage unit 47.

Figure 7:
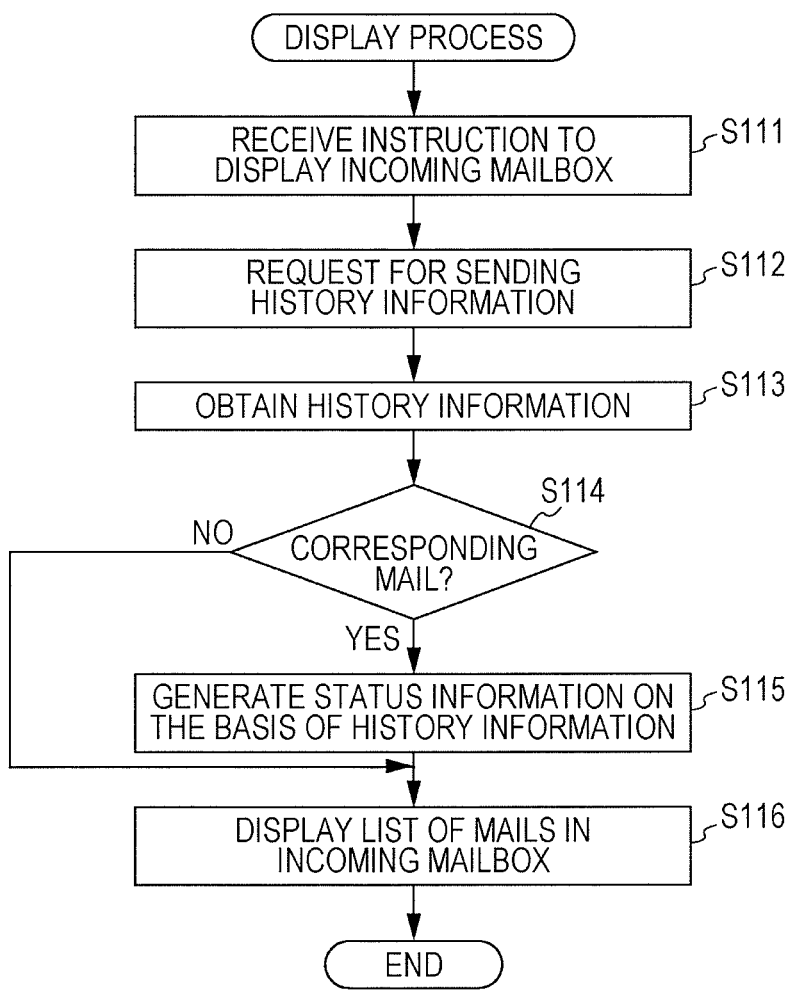
FIG. 7 is a flowchart illustrating a display process according to the first exemplary embodiment.

According to this exemplary embodiment, a user who has not performed any action on an e-mail addressed to plural users is provided with the status of processes performed by users on the e-mail. Hereinafter, a process of displaying status information will be described with reference to the flowchart illustrated in FIG. 7.

When the e-mail tool is activated, the storage status of e-mails in the incoming mailbox is displayed on an initial screen, as in the above-described example. At the time when the e-mail tool is activated, the history information obtaining unit 334 sends a request for sending history information (this request is referred to as "send request") to the mail server 40 (step S112). The send request includes the mail address (user ID) corresponding to the incoming mailbox to be opened, and a certain display target condition, which is the mail ID of an unopened e-mail among the e-mails addressed to plural users contained in the incoming mailbox. Whether an e-mail is addressed to plural users may be determined on the basis of the mail ID attached thereto. As described below, in this exemplary embodiment, status information that is generated on the basis of history information is displayed in association with the corresponding e-mail. The "certain display target condition" is a condition for specifying the e-mail for which the status information is to be displayed. Here, an unopened e-mail that is addressed to plural users satisfies the certain display target condition. Alternatively, the limitation "unopened" may be removed from the certain display target condition. Also, if it is determined that there exist a large number of (for example, a certain number or more of) unopened e-mails, a time limitation may be added to the condition. For example, e-mails distributed in the past month satisfy the condition. Alternatively, the range of the number of destinations may be specified. For example, e-mails having a mail ID associated with mail information in which the number of destinations is two to five among mail IDs included in the send request satisfy the condition.

The history information providing unit 45 of the mail server 40 receives the send request from the user terminal apparatus 30, and then supplies the content of the send request to the history information generating unit 44.

The history information generating unit 44 first performs the following processes in order on a mail ID that is included in the send request and that is specified as the certain display target condition. First, the history information generating unit 44 extracts the mail information corresponding to the mail ID as a process target from the mail information storage unit 46. Then, the history information generating unit 44 searches the process detection information storage unit 47 by using the mail ID as a key, and extracts the process detection information that matches the mail ID. The number of extractions corresponds to the number of processes performed on the e-mail. Note that, in this exemplary embodiment, the number of pieces of process detection information is counted for individual processes. That is, pieces of process detection information that match the mail ID as the process target are classified by process IDs. Accordingly, the number of users who have performed respective processes, for example, the number of users who have displayed the mail text, the number of users who have sent a reply, etc., may be recognized regarding the e-mail having the mail ID.

In this exemplary embodiment, an index value called an action ratio or a process ratio is obtained as history information. The action ratio is a value indicating the ratio of users who have performed a process on an e-mail addressed to plural users to the destinations of the e-mail. As the action ratio is higher, the number of users who have performed a process on the e-mail is larger.

In this exemplary embodiment, processes are classified using a certain process classification standard. As illustrated in FIG. 5, in this exemplary embodiment, the processes are classified depending on their types using a certain standard, in which a positive process is represented by "p" and a negative process is represented by "n". Thus, in this exemplary embodiment, an action ratio is calculated for each classification item. That is, in this example, processes are classified in accordance with the classification standard of user's attitude. For example, an action of reading the entire mail text by scrolling it and an action of sending a reply are classified to a process group "p", which represents a positive process. On the other hand, an action of deleting an e-mail and an action of handling an e-mail as an unwanted e-mail are classified to a group "n", which represents a negative process.

It is assumed that the action ratio of positive processes represented by "p" is referred to as a positive action ratio. The positive action ratio is calculated by dividing the sum of the numbers of individual positive processes by the number of destinations. The individual positive processes include "display mail text", "scroll mail text to the end", "open attachment file", "click URL in mail text", "send reply", "forward e-mail", and "add tag". In some cases, plural mail addresses of a single user may be specified as destinations of an e-mail. However, it is assumed here that only one mail address is specified as a destination of an e-mail for a single user. In this case, the positive action ratio is a ratio of users who have performed a positive process to all the users specified as the destinations of the e-mail.

Likewise, it is assumed that the action ratio of negative processes represented by "n" is referred to as a negative action ratio. The negative action ratio is calculated by dividing the sum of the numbers of individual negative processes by the number of destinations. The individual negative processes include "delete e-mail" and "designate e-mail as unwanted e-mail".

In this way, according to this exemplary embodiment, action ratios are calculated for predetermined respective classification items, that is, a positive action ratio and a negative action ratio. Of course, an action ratio for all the processes may be calculated without using such classification, or action ratios may be calculated for individual process.

The above-described procedure of calculating action ratios is merely an example, and action ratios may be calculated in another procedure. For example, action ratios may be calculated for individual processes, and the sum of the action ratios of the processes belonging to the same classification item may be obtained.

It is easily assumed that one user performs plural processes on a single e-mail, for example, the user displays a single e-mail plural times, or the user displays an e-mail ("prc001") and sends a reply another day ("prc005"). In this case, process detection information is generated every time a process is performed. Thus, plural pieces of process detection information are stored in the process detection information storage unit 47 for a single e-mail. In order to enhance the accuracy of an action ratio, redundant counting of processes performed by one user may be prevented with reference to the user ID or the user ID and the process ID included in process detection information. For example, it is assumed that a user performs a process "display mail text" and a process "send reply" on different days, so that the pieces of process detection information of the respective processes are registered in the process detection information storage unit 47. For example, in the case of calculating action ratios for the individual processes, which are classified into different groups, each of the action ratio for "display mail text" and the action ratio for "send reply" may be calculated by counting the pieces of process detection information. However, if the pieces of process detection information belonging to the same classification item are counted to calculate a positive action ratio, pieces of process detection information based on processes performed by a single user are redundantly counted. In such a case, redundant counting of pieces of process detection information based on the same user may be prevented.

In the manner described above, the history information generating unit 44 performs a process of generating the above-described positive action ratio and negative action ratio on each of the mail IDs included in the send request. In this way, the history information generating unit 44 generates action ratios serving as history information. In a case where the certain display target condition is not specified in the send request, the process may be repeatedly performed on all the pieces of mail information registered in the mail information storage unit 46. The history information providing unit 45 sends the history information generated in this way to the user terminal apparatus 30, which is the source of the send request.

In this exemplary embodiment, action ratios are sent as history information. Alternatively, the history information to be sent may include the number of destinations, the number of integrations of process detection information, etc.

Also, the history information generating unit 44 may temporarily hold the generated history information for a certain period. Accordingly, a process of generating history information, specifically, a process of calculating an action ratio, may not be performed for a send request for the same mail ID, and a temporarily held calculation result for the mail ID may be provided as history information. The certain period may have a fixed time length. However, just after distribution of an e-mail, many users are likely to perform an action, and many pieces of process detection information used for calculating an action ratio are likely to be collected. Thus, the certain period may be set to a relatively short period, for example, five minutes, for thirty minutes just after distribution, and the certain period may be set to a longer period in accordance with the elapse of time.

Referring back to FIG. 7, when history information is sent from the mail server 40 in response to the send request, the history information obtaining unit 334 receives and obtains the history information (step S113). Then, the display processing unit 331 generates status information to be displayed on the display 8 on the basis of the obtained history information. That is, when the e-mail tool is activated, the display processing unit 331 tries to display the incoming mailbox on the initial screen. At this time, the history information obtaining unit 334 obtains history information. Thus, the display processing unit 331 generates status information on the basis of the obtained history information, and displays the incoming mailbox such that status display icons are added to target e-mails, as illustrated in FIG. 8.

Figure 8:
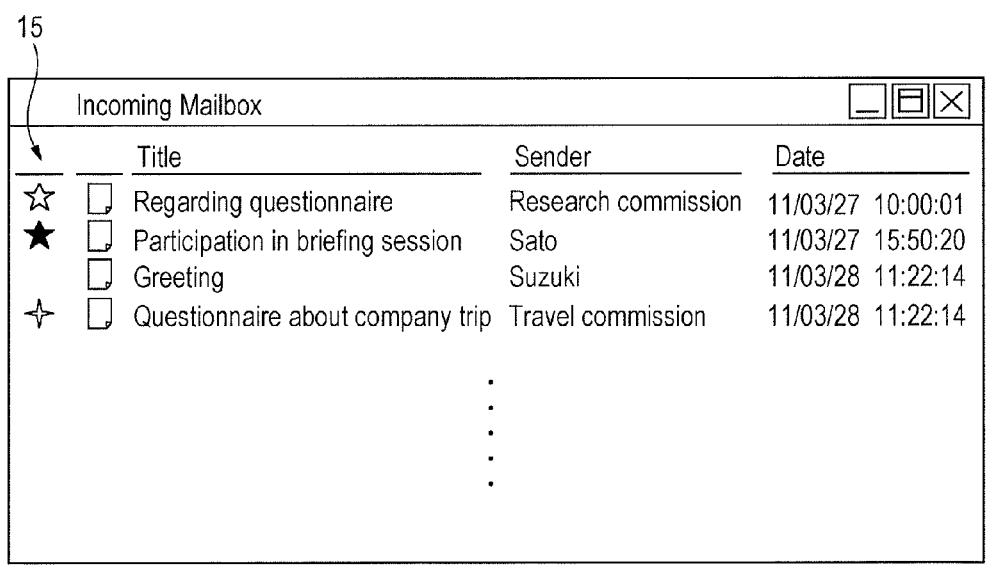
FIG. 8 is a diagram illustrating an example of a screen displaying information representing the status of actions performed by users on electronic mails.

FIG. 8 is a diagram illustrating an example of a display screen provided by the e-mail function according to this exemplary embodiment, that is, an example display of a list of e-mails stored in the incoming mailbox. In the example in FIG. 8, titles, senders, and dates and times of the respective received e-mails are displayed in a list. Also, icons representing a newly-arrived e-mail, unopened, etc. are displayed just before the titles (on the left side of the titles). Furthermore, just before the icons (on the left side of the icons), that is, at the top of rows of pieces of information about the respective e-mails, a status display field 15 for displaying status display icons, which correspond to a feature of this exemplary embodiment, is provided. That is, the display processing unit 331 generates, on the basis of the received history information, a status display icon serving as status information representing the status of actions performed by users on an e-mail addressed to plural users, and displays the status display icon in association with a row of the title of the corresponding e-mail. Hereinafter, a row of information about an e-mail, such as a title, will be simply referred to as an "e-mail" for the convenience of description.

In the example in FIG. 8, the meaning of an action ratio is expressed by the shape of a status display icon. Alternatively, differences in action ratio may be expressed by varying a display attribute of a status display icon, such as the size, color, brightness, or blinking speed of the status display icon. Also, the level of the action ratio may be expressed by stepwise varying a display attribute of a status display icon, such as the size, color, brightness, or blinking speed of the status display icon. In the example in FIG. 8, the status display field 15 has a space for only one icon. Alternatively, the status display field 15 may have a larger space so that plural status display icons may be displayed for each e-mail. Also, action ratios calculated for respective processes may be received from the mail server 40, and status display icons representing the action ratios of the respective processes may be displayed.

Alternatively, instead of displaying all the pieces of history information obtained from the mail server 40, individual action ratios included in the pieces of history information may be compared with a certain threshold. In accordance with the comparison result, status display icons representing the action ratios may be displayed, or a status display icon may not be displayed as in an e-mail addressed to an individual. Alternatively, a status display icon may be displayed for only an e-mail in which the number of destinations is a certain number or less or a certain number or more. In the description given above, a certain display target condition is set to a request for sending history information. Alternatively, the certain display target condition may be applied when generating status information on the basis of obtained history information, instead of setting the condition to the request for sending history information.

Also, according to another example of a process of displaying status information in association with a corresponding e-mail, the form of displaying the incoming mailbox may be different from an ordinary case. For example, received e-mails listed in the order of the date/time of reception may be sorted in descending order or ascending order of the action ratio.

By referring to such an action ratio, that is, the status of actions performed by users on an e-mail, a user may recognize the necessity of performing an action on the e-mail. For example, an e-mail having a high positive action ratio represents that users have positively performed actions, such as reference, on the e-mail. Thus, a user who sees the status display icon representing such a status may perform an action, for example, display the e-mail. On the other hand, an e-mail having a high negative action ratio represents that the e-mail is unnecessary for users. Thus, a user who sees the status display icon representing such a status may perform an action, for example, delete the e-mail.

In this exemplary embodiment, history information representing the history of processes performed by users is generated on the mail server 40 side, and status information representing the status of actions performed by users is generated on the user terminal apparatus 30 side on the basis of the history information. Alternatively, the status information may be generated on the mail server 40 side, and the display processing unit 331 may simply display the status information sent from the mail server 40.

As described above, in this exemplary embodiment, in a case where plural destinations are specified in an e-mail requested to be distributed, the mail ID to be added to the e-mail is generated by the mail distribution processing unit 41 of the mail server 40. That is, the distribution apparatus including the mail distribution processing unit 41 according to this exemplary embodiment has a function of generating a mail ID to be added to an e-mail addressed to plural users, in addition to the existing mail server function. Alternatively, the existing mail server function may be used as is, and a mail ID may not be generated and added.

For example, the reception notifying unit 322 is capable of generating mail identification information by extracting a set of the sender, title, and date/time of sending of a received e-mail, or part of these character strings. An e-mail addressed to plural users includes same character strings in information other than the title, etc. Thus, the reception notifying unit 322 extracts the character string and generates mail identification information so that the e-mail is distinguishable from another e-mail. In this way, mail identification information may be added to an e-mail on the user terminal apparatus 30 side.

In the above-described process, the reception notifying unit 322 is capable of determining a received e-mail to be an e-mail addressed to plural users because the e-mail has a mail ID. As a result, the reception notifying unit 322 is capable of notifying the mail server 40 of the reception of the e-mail addressed to plural users. If the mail server 40 does not add a mail ID, the reception notifying unit 322 is incapable of determining whether a received e-mail is addressed to plural users or an individual. Thus, the reception notifying unit 322 performs reception notification for all e-mails with respect to the mail server 40. Also, the mail receiving unit 321 adds the mail identification information generated by the reception notifying unit 322 to a received e-mail, and stores the e-mail in the incoming mailbox.

Furthermore, the process detecting unit 332 detects processes performed on all e-mails. Process detection information representing the detected processes is registered in the process detection information storage unit 47.

When the history information generating unit 44 generates history information, if only e-mails in which the number of destinations included in the mail information is two or more are regarded as a process target, at least e-mails addressed to an individual are not regarded as a target for generating history information.

Second Exemplary Embodiment

In the above-described first exemplary embodiment, action ratios as history information are obtained for positive processes and negative processes, respectively, and are presented to the user using status display icons. In a second exemplary embodiment, history information is generated on the basis of process detection information that satisfies a condition on the basis of user attribute information, and status information generated on the basis of the history information is displayed. That is, status information about the processes performed by users that match an attribute of the user of the user terminal apparatus 30 is displayed.

Figure 9:
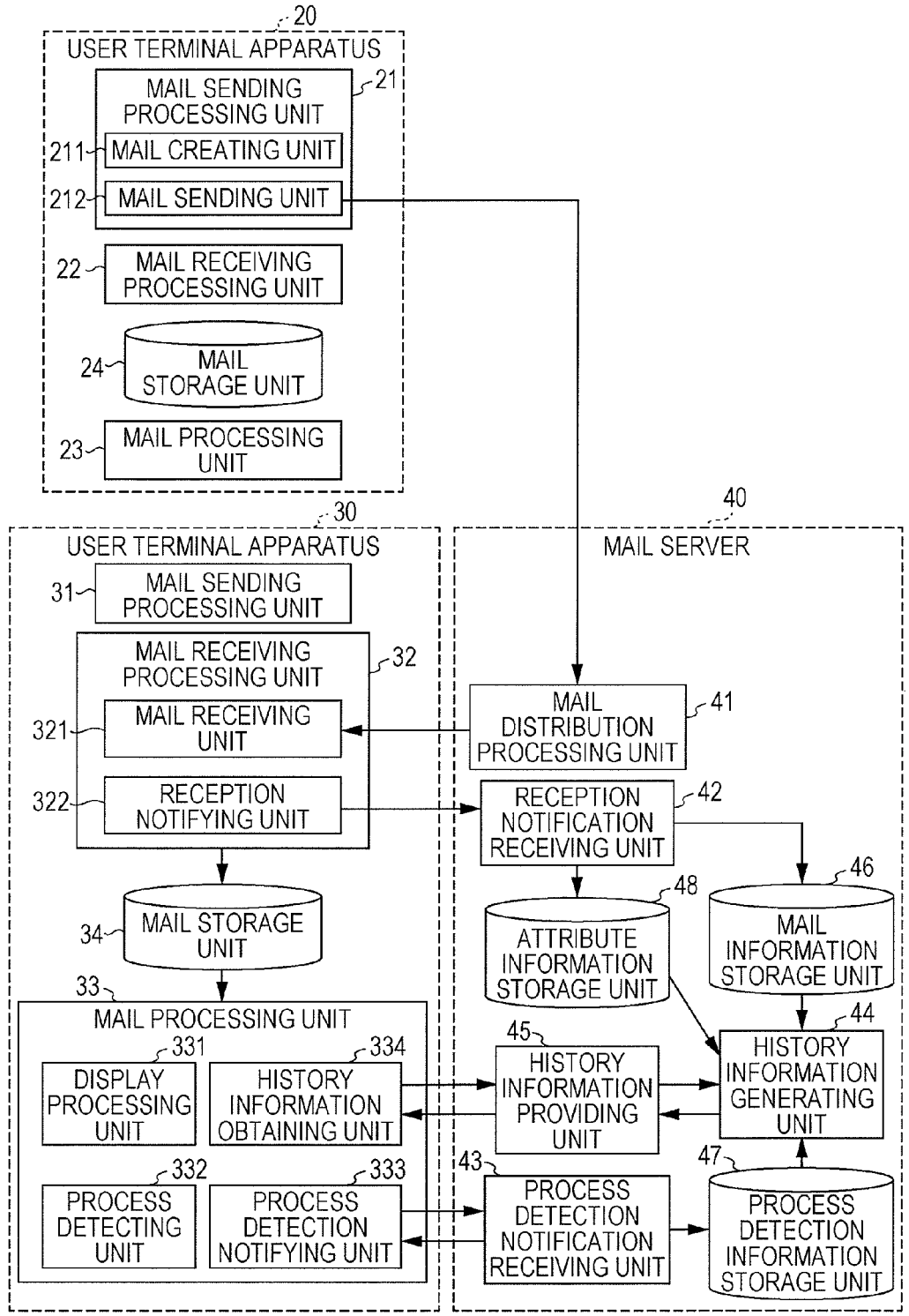
FIG. 9 is a block diagram illustrating a configuration of an electronic mail system according to a second exemplary embodiment of the present invention.

FIG. 9 is a block diagram illustrating an example configuration of an e-mail system according to the second exemplary embodiment. The e-mail system according to the second exemplary embodiment has an attribute information storage unit 48 in addition to the elements of the e-mail system according to the first exemplary embodiment. The attribute information storage unit 48 may be realized by the HDD 4.

FIG. 10 is a diagram illustrating an example of a data structure of attribute information according to this exemplary embodiment. The attribute information that is registered includes a user ID for identifying a user, which is associated with the attributes of the user and a mail ID for identifying an e-mail received by the user.

The second exemplary embodiment is the same as the first exemplary embodiment except that the attribute information storage unit 48 is provided and that a process regarding attribute information is different. Hereinafter, the operation of the second exemplary embodiment will be described while focusing attention on a process different from that in the first exemplary embodiment.

First, the mail distribution processing unit 41 of the mail server 40 generates a mail ID and adds it to an e-mail addressed to plural users sent from the user terminal apparatus 20, and distributes the e-mail to the destinations specified in the e-mail, as in the first exemplary embodiment.

Accordingly, the user terminal apparatus 30 receives the e-mail. Then, the reception notifying unit 322 sends reception notification information including the mail ID to the mail server 40, as in the first exemplary embodiment. Note that the reception notifying unit 322 according to this exemplary embodiment extracts, from an attribute information database (not illustrated) of the e-mail tool, attribute information about the user having the mail address specified as the destination, in other words, the user of the user terminal apparatus 30, adds the extracted attribute information to the reception notification information, and sends the reception notification information.

In the mail server 40, the reception notification receiving unit 42 increments the number of destinations corresponding to the mail ID included in the reception notification information among the numbers of destinations stored in the mail information storage unit 46, as in the first exemplary embodiment. Furthermore, in this exemplary embodiment, the attribute information included in the reception notification information is registered in the attribute information storage unit 48. If the attribute information has already been registered, the individual values of attributes specified by the user ID are updated to the values included in the newly received attribute information. Also, the mail ID included in the reception notification information is added to the mail IDs included in the attribute information stored in the attribute information storage unit 48.

The process that is performed thereafter when an e-mail is distributed, and the process monitoring process are the same as those in the first exemplary embodiment, and thus the description thereof is omitted.

Next, a process of displaying information representing the status of processes performed by users will be described. In this process, the process performed by the user terminal apparatus 30 is the same as that according to the first exemplary embodiment, which is illustrated in the flowchart in FIG. 7. However, the process of generating history information performed by the history information generating unit 44 is different from that according to the first exemplary embodiment. That is, in the first exemplary embodiment, the history information generating unit 44 searches the process detection information storage unit 47 by using a mail ID as a key, and extracts process detection information that matches the mail ID. According to the second exemplary embodiment, the history information generating unit 44 further extracts, from the extracted process detection information, an attribute of the user specified by the user ID included in the mail ID send request from the attribute information storage unit 48, specifies a user ID having an attribute that matches the extracted attribute, and extracts process detection information including the specified user ID. Accordingly, for example, the history information generating unit 44 calculates the action ratio of users having an attribute of a male. The attribute used as a search key for extracting process detection information may be set by an administrator of the mail server 40 or the sender of the e-mail.

According to the first and second exemplary embodiments, all of the mail sending processing unit 31, the mail receiving processing unit 32, the mail processing unit 33, and the mail storage unit 34 are provided in the user terminal apparatus 30. Alternatively, e-mails for plural users may be managed in a concentrated manner by another server, and user terminal apparatuses may only perform display processes and reception of input using a technology of asynchronous Java (registered trademark) script+XML (AJAX).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electronic mail system comprising:
a plurality of user terminal apparatuses;
a distribution apparatus that distributes an electronic mail to a specified destination in response to a distribution request for distributing the electronic mail, the distribution request being sent from any of the plurality of user terminal apparatuses;
an information providing apparatus; and
a storage device,
each of the plurality of user terminal apparatuses including:
 a display processing unit that performs a process to display a list of electronic mails addressed to a user of the user terminal apparatus, the electronic mails including an electronic mail that is distributed from the distribution apparatus and that is addressed to a plurality of users;
 a detecting unit that detects a process specified to be performed by the user on an electronic mail displayed by the display processing unit; and
 a process detection information sending unit that sends process detection information that includes process specification information specifying details of the process detected by the detecting unit and mail identification information about the electronic mail on which the process has been performed,
the information providing apparatus including:
 a registration unit that obtains the process detection information sent by the process detection information sending unit and registers the process detection information in the storage device;
 a history information generating unit that generates history information representing history of processes performed by users on the electronic mail addressed to the plurality of users on the basis of the process detection information registered in the storage device; and
 a history information sending unit that sends the generated history information to the user terminal apparatus,
wherein the display processing unit generates, on the basis of the history information generated by the history information generating unit, status information representing a status of actions performed by users on the electronic mail addressed to the plurality of users, and displays the generated status information in association with the corresponding electronic mail,
wherein the status of actions performed by users includes a status of whether a file attached to the electronic mail has been opened, and
wherein the display processing unit further generates an action ratio of the status information, the action ratio is a value indicating a ratio of users who have performed a process on the electronic mail.

2. The electronic mail system according to claim 1,
wherein the display processing unit generates the status information on the basis of history information corresponding to an electronic mail that satisfies a certain display target condition, and displays the generated status information.

3. The electronic mail system according to claim 2,
wherein the user terminal apparatus includes a history information obtaining unit that sends, to the information providing apparatus, a send request for sending the history information corresponding to the electronic mail that satisfies the certain display target condition, and that obtains the history information sent in response to the send request, and
wherein the history information generating unit generates the history information corresponding to the electronic mail that satisfies the certain display target condition, the history information being specified by the send request sent from the history information obtaining unit.

4. The electronic mail system according to claim 3,
wherein the information providing apparatus includes an attribute information obtaining unit that obtains attribute information about a user,
wherein the user terminal apparatus includes a reception notification information sending unit that sends, when receiving an electronic mail distributed by the distribution apparatus, reception notification information including the mail identification information about the electronic mail and the attribute information of the user, and wherein the history information generating unit refers to the attribute information obtained by the attribute information obtaining unit, and generates history information for each attribute item on the basis of the process detection information sent from the user terminal apparatus used by the user related to attribute information that matches the attribute information of the user who uses the user terminal apparatus that has sent the send request.

5. The electronic mail system according to claim 1, wherein the history information generating unit classifies the process detection information registered in the storage device in accordance with a certain process classification standard, and generates history information for each classification item on the basis of the classified process detection information.

6. The electronic mail system according to claim 1, further comprising:

a reception notification information sending unit that sends reception notification information including mail identification information about an electronic mail distributed by the distribution apparatus when the electronic mail is received at a destination, wherein the information providing apparatus includes a number-of-destinations obtaining unit that receives the reception notification information sent by the reception notification information sending unit, counts the number of pieces of the received reception notification information for each piece of mail identification information included in the received reception notification information, and obtains the counted number as the number of destinations of the electronic mail, and wherein the history information generating unit generates, as the history information, a process ratio indicating a ratio of users who have performed a process on the electronic mail to the destinations of the electronic mail.

7. The electronic mail system according to claim 1, wherein the distribution apparatus distributes the electronic mail addressed to the plurality of users requested to be distributed to individual destinations after adding mail identification information for identifying the electronic mail to the electronic mail.

8. The electronic mail system according to claim 1, wherein the display processing unit further generates a display icon based on the generated action ratio, the display icon distinguishes the generated action ratio from another action ratio.

9. A user terminal apparatus comprising:

a display processing unit that performs a process to display a list of electronic mails addressed to a user of the user terminal apparatus, the electronic mails including an electronic mail addressed to a plurality of users;

a detecting unit that detects a process specified to be performed by the user on an electronic mail displayed by the display processing unit; and a process detection information sending unit that sends process detection information that includes process specification information specifying details of the process detected by the detecting unit and mail identification information about the electronic mail on which the process has been performed, wherein the display processing unit generates, on the basis of history information that is generated by an information providing apparatus on the basis of the process detection information and that represents history of processes performed by users on the electronic mail addressed to the plurality of users, status information representing a status of actions performed by users on the electronic mail addressed to the plurality of users and an action ratio of the status information, and displays the generated status information in association with the corresponding electronic mail, wherein the status of actions performed by users includes a status of whether a file attached to the electronic mail has been opened, and wherein the action ratio is a value indicating a ratio of users who have performed a process on the electronic snail.

10. The user terminal apparatus according to claim 9, wherein the display processing unit further generates a display icon based on the generated action ratio, the display icon distinguishes the generated action ratio from another action ratio.

11. An information providing apparatus comprising:

a registration unit that obtains process detection information that is sent from any of a plurality of user terminal apparatuses and that includes process specification information specifying details of a process specified to be performed by a user on an electronic mail addressed to a plurality of users and mail identification information about the electronic mail on which the process has been performed, and registers the process detection information in a storage device;

a history information generating unit that generates, in response to a send request from any of the plurality of user terminal apparatuses, history information representing history of processes performed by users on the electronic mail addressed to the plurality of users on the basis of the process detection information registered in the storage device; and a sending unit that sends the generated history information to the user terminal apparatus as a source of the send request, wherein the history information includes:

status information about whether a file attached to the electronic mail has been opened by the users, and an action ratio of the status information, the action ratio is a value indicating a ratio of users who have performed a process on the electronic mail.

12. A non-transitory computer readable medium storing a program causing a computer to execute a process, the process comprising:

performing a process to display a list of electronic mails addressed to a user of a user terminal apparatus, the electronic mails including an electronic mail addressed to a plurality of users;

detecting a process specified to be performed by the user on an electronic mail displayed;

sending process detection information that includes process specification information specifying details of the detected process and mail identification information about the electronic mail on which the process has been performed; and generating, on the basis of history information that is generated by an information providing apparatus on the basis of the process detection information and that represents history of processes performed by users on the electronic mail addressed to the plurality of users, status information representing a status of actions performed by users on the electronic mail addressed to the plurality of users and an action ratio of the status information, and displaying the generated status information in association with the corresponding electronic mail, wherein the status of actions performed by users includes a status of whether a file attached to the electronic mail has been opened, and wherein the action ratio is a value indicating a ratio of users who have performed a process on the electronic mail.

13. A non-transitory computer readable medium storing a program causing a computer to execute a process, the process comprising:

obtaining process detection information that is sent from any of a plurality of user terminal apparatuses and that includes process specification information specifying details of a process specified to be performed by a user on an electronic mail addressed to a plurality of users and mail identification information about the electronic mail on which the process has been performed, and registering the process detection information in a storage device;

generating, in response to a send request from any of the plurality of user terminal apparatuses, history information representing history of processes performed by users on the electronic mail addressed to the plurality of users on the basis of the process detection information registered in the storage device; and sending the generated history information to the user terminal apparatus as a source of the send request, wherein the history information includes:
status information about whether a file attached to the electronic mail has been opened by the users; and
an action ratio of the status information, the action ratio is a value indicating a ratio of users who have performed a process on the electronic mail.

* * * * *